UNITED STATES PATENT OFFICE.

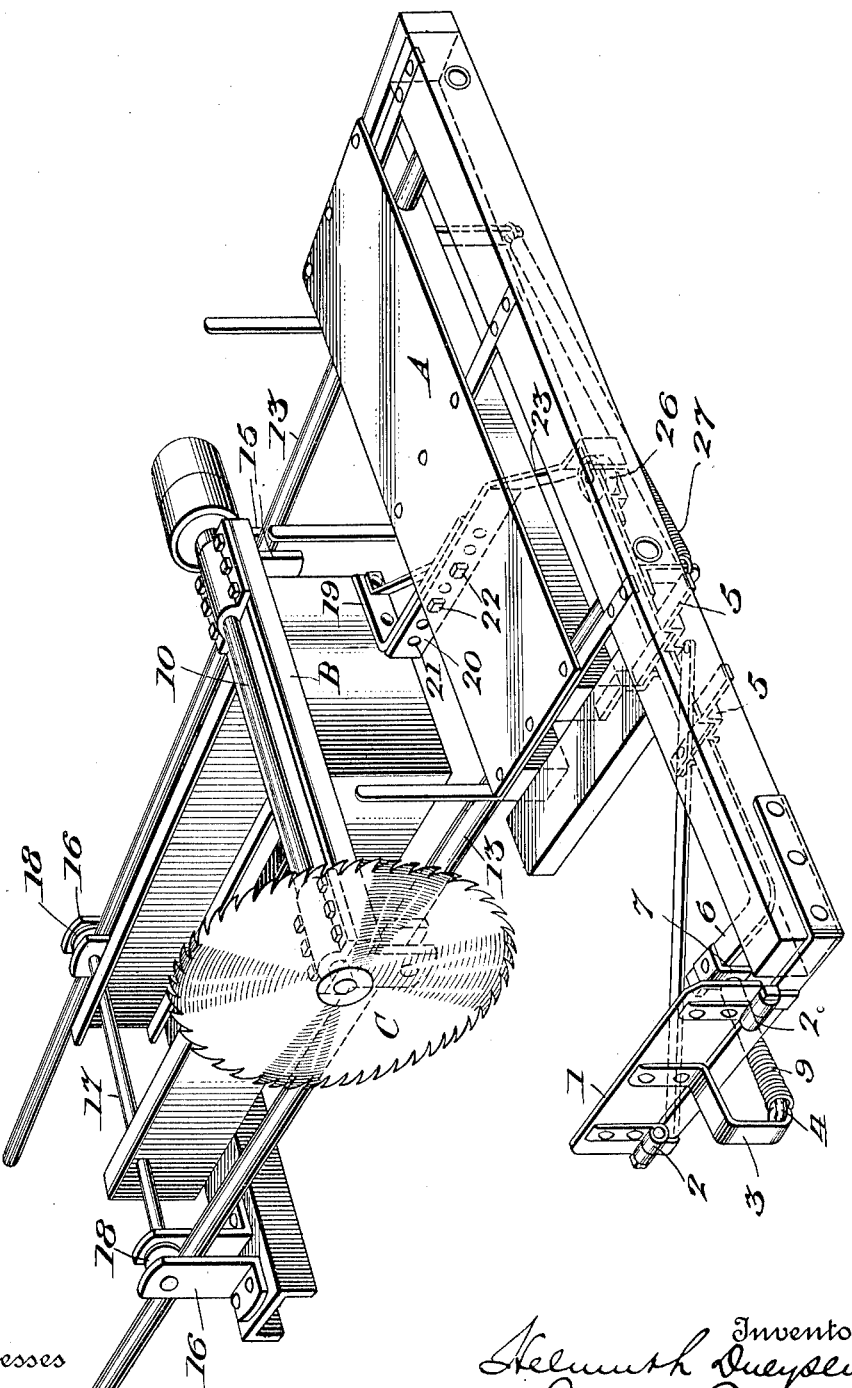

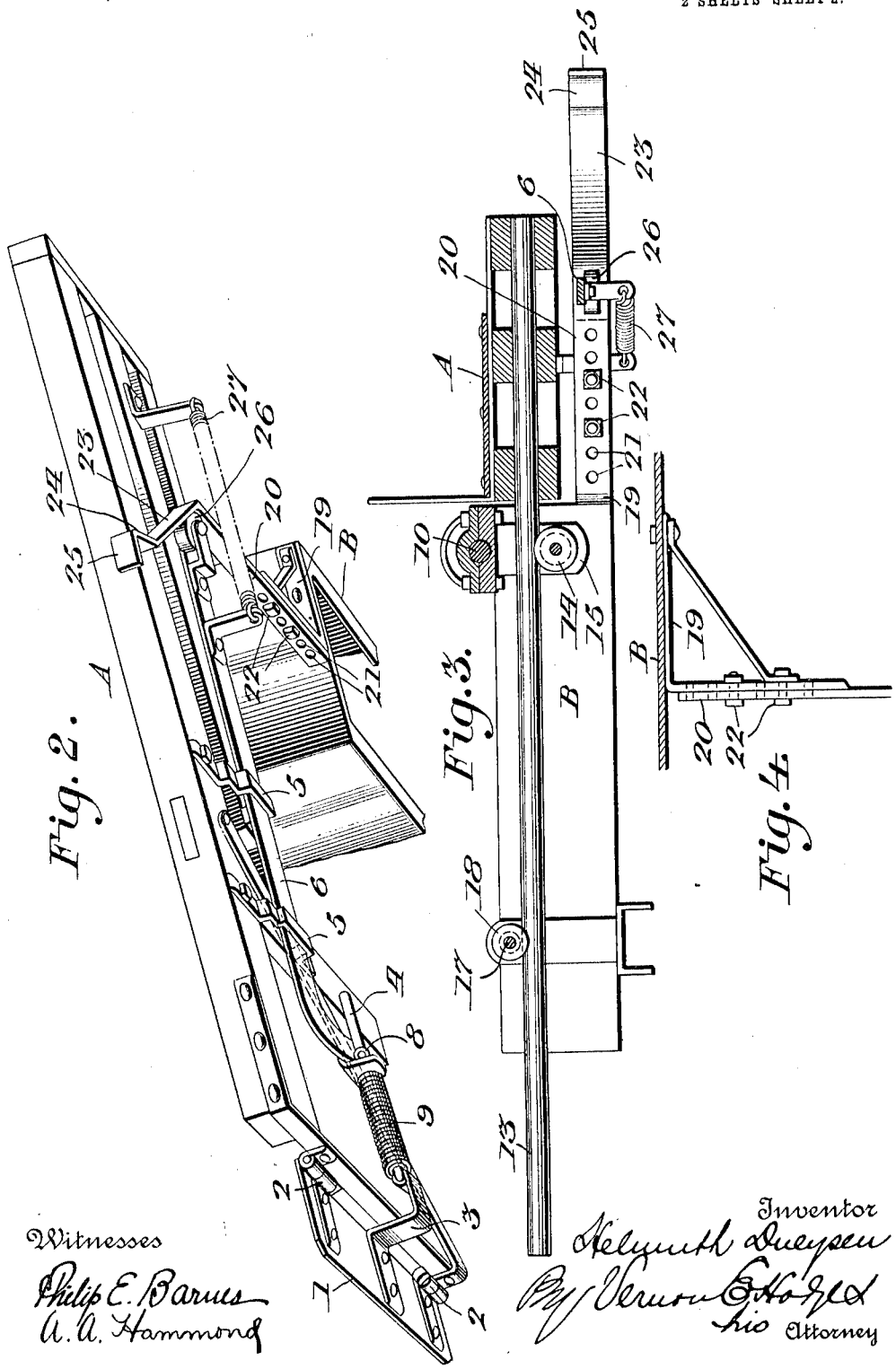

HELMUTH DUEYSEN, OF THORP, WISCONSIN.

SAW-GAGE.

1,073,969.  Specification of Letters Patent.  Patented Sept. 23, 1913.

Application filed January 11, 1913. Serial No. 741,399.

*To all whom it may concern:*

Be it known that I, HELMUTH DUEYSEN, a citizen of the United States, residing at Thorp, in county of Clark and State of Wisconsin, have invented certain new and useful Improvements in Saw-Gages, of which the following is a specification.

My invention relates to an improvement in saw gages and the object is to provide means for causing the gage to be automatically actuated upon the movement of the carriage from and toward the saw.

The invention consists of certain novel features of construction and combinations of parts which will be hereinafter described and pointed out in the claims.

In the accompanying drawings—Figure 1 is a perspective view of the machine showing the invention applied thereto; Fig. 2 is a perspective view of the invention; Figs. 3 and 4 are detail views.

A represents the carriage upon which the log is placed, and 1 is the saw gage which is pivotally mounted by means of hinges 2, 2, at one end of the carriage. A lever 3 is connected to the gage 1 and pivotally connected to the lever is a link 4. A bar 6 is slidably mounted in brackets 5 which brackets are connected to the under side of the carriage A. A lip 7 formed on the bar 6 has an opening therethrough through which an end of the link 4 extends and which is fastened in position by means of a cotter pin 8. A coil spring 9 is mounted upon the link and is located between the lip 7 and the lever 3 and causes the saw-gage 1 to be normally held in a vertical position.

A frame B has a saw shaft 10 mounted thereon and upon the shaft is a saw C. Connected to the carriage A are shafts 13 which pass over rollers 14 carried in brackets 15 by the frame B and thence beneath the grooved rollers 18 mounted upon a shaft 17, the shaft 17 being supported by the frame B, and extending from the outer ends of the shaft and on each side of the rollers 18 are guards 16 which are connected to the frame B for holding the shafts 13 against lateral movement. A bracket 19 is connected to the forward end of the frame B, and connected to the bracket is a track 20 which is provided with a plurality of openings 21 whereby the track can be adjustably connected to the bracket for lengthening and shortening the track, according to the size of the saw used, by means of bolts 22. The track 20 extends preferably at an oblique angle as at 23 and then extends parallel as at 24, to the main portion 20, a stop 25 being formed at the end of the track for preventing the roller or wheel 26 carried by the bar 6 from passing off of the track. A coil spring 27 is connected to the bar 6 and to the carriage A for holding the roller or wheel 26 in engagement with the track.

Prior to mounting the log upon the carriage, the carriage is moved to its position whereby the gage 1 will be brought to a vertical position and the wheel 26 carried by the bar 6 will be resting upon the right angular portion 24 of the track 20. The log is then placed upon the carriage and one end of the log engages the gage thereby determining the length of the cut to be made. As the carriage A is moved toward the saw C, the wheel 26 will travel along the oblique angular formation of the track 20 thereby gradually drawing the gage away from the end of the log and bringing the gage from a vertical to a horizontal position or sufficiently below the end of the carriage to permit of the log, or a portion which has been cut, being removed easily and readily. The lowering of the gage prevents any possibility of binding of the wood or log upon the saw during the cutting operation.

Having fully described my invention, what I claim as new and desire to secure by Letters Patent, is—

1. The combination of a frame and a movable carriage, a saw mounted upon the frame, of a gage pivotally mounted at one end of the carriage, a track connected to the frame, and means connected to the gage engaging the track for causing the gage to be lowered as the carriage is moved toward the saw.

2. The combination with a movable carriage and a frame, a saw mounted on the frame, a gage pivotally mounted at one end to the carriage, a lever connected thereto, a bar slidably mounted on the carriage, a link connecting the lever and bar, an angular track connected to the frame, and a wheel connected to the bar adapted to travel along the track for drawing the gage away from the end of the log being cut and below the level of the table as the carriage is moved toward the saw.

In testimony whereof I affix my signature, in the presence of two witnesses.

HELMUTH DUEYSEN.

Witnesses:
LAURENCE SELESK,
GEORGE BURKE.

Copies of this patent may be obtained for five cents each, by addressing the "Commissioner of Patents, Washington, D. C."